(12) United States Patent
Lambert

(10) Patent No.: US 7,490,246 B2
(45) Date of Patent: Feb. 10, 2009

(54) METHOD FOR ENCRYPTION OF DATA BASED ON AN ITERATION OF A STORED ENCRYPTION KEY

(75) Inventor: Howard S. Lambert, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 11/468,500

(22) Filed: Aug. 30, 2006

(65) Prior Publication Data

US 2007/0101137 A1 May 3, 2007

Related U.S. Application Data

(62) Division of application No. 10/076,380, filed on Feb. 14, 2002, now Pat. No. 7,133,522.

(30) Foreign Application Priority Data

Apr. 5, 2001 (GB) .................................... 0108560

(51) Int. Cl.
*H04L 9/32* (2006.01)
*H04L 9/00* (2006.01)
(52) U.S. Cl. ........................ 713/189; 713/193; 380/277; 380/46
(58) Field of Classification Search ......... 713/192–194, 713/189; 380/46, 255, 277; 726/17, 20–21, 726/26–27, 34
See application file for complete search history.

(56) References Cited

U.S. PATENT DOCUMENTS 5,479,513 A    12/1995   Protopopescu et al.
5,696,826 A    12/1997   Gao
5,751,811 A     5/1998   Magnotti et al.
6,014,445 A     1/2000   Kohda et al.
6,078,665 A     6/2000   Anderson et al.
7,293,287 B2 *  11/2007  Fischman et al. ............. 726/22
7,356,846 B2 *   4/2008  Konersmann ................ 726/26

FOREIGN PATENT DOCUMENTS

EP          0467239 A2       1/1992

OTHER PUBLICATIONS

Yu-Huang et al., "Dynamic date encryption system based on synchronized chaotic systems", 1999, Electronic Letters, vol. 35, pp. 271-272.

* cited by examiner

*Primary Examiner*—Hosuk Song
(74) *Attorney, Agent, or Firm*—Stephen J. Walder, Jr.; Jeffrey LaBaw

(57) ABSTRACT

A method for encryption and decryption of data items is provided by defining a cipher key based on variables in a Chaotic Equation. The method includes selecting a Chaotic Equation from a set of Chaotic Equations, defining starting conditions of the variables of the equation, and applying the equation to each data item. The real and imaginary parts of the result of the iteration of the Chaotic Equation are combined with the data item by an arithmetic operation, for example, an XOR operation. Data items in a continuous stream with a rate dependency can be encrypted and decrypted on an item by item basis. The input or cipher key changes for each byte of the data encryption. Blocks of data can be encrypted using the method with an identifier of the order of the blocks in the data stream. If blocks are received out of sequence, the identifiers can be used to maintain the correct decryption order. The method of encryption and decryption can be used in devices to avoid the need for a session key. The continuously updating input or cipher key enables fraudulent use of devices to be identified.

14 Claims, 9 Drawing Sheets

METHOD FOR ENCRYPTION OF DATA BASED ON AN ITERATION OF A STORED ENCRYPTION KEY

This application is a divisional of application Ser. No. 10/076,380, filed Feb. 14, 2002 now U.S. Pat. No. 7,133,522, status allowed.

FIELD OF THE INVENTION

This invention relates to a method and apparatus for encryption of data. In particular, the invention relates to encryption of streams and blocks of data using encryption based on Chaos Equations.

BACKGROUND OF THE INVENTION

Data which is transmitted by any means, including along telecommunication links, via media such as storage disks, etc., must be protected to prevent the data being picked up and used by parties other than the intended recipient.

Security of information is a highly important aspect for any party transferring data. Users of networks, especially users of the Internet, are particularly vulnerable to unwanted parties intercepting data. The users may be commercial organisations, governments, universities or private individuals. Networks pass a huge variety of valuable, important and often confidential information. If the information is not secure, the consequences to the user can be disastrous. For example, the results may include financial losses, disclosure of confidential information, loss of confidence from clients and disruption to the user's activities.

In addition to transfer of information via networks, data transferred via other media such as storage disk, is also vulnerable to interception by unwanted parties.

To prevent such intrusion, data encryption methods are used to protect information during transmission from one end point to another. Encryption scrambles the data to make it unintelligible during transmission. In encryption systems, plain data is converted to a secure coded data (ciphertext) using an encryption method or algorithm with a secret key. A secret key is known only to the sender and the recipient. The recipient at the intended destination can decrypt the data by using the previously agreed secret key and the reverse of the encryption algorithm.

Data, such as binary data, text data and other forms of data which does not need to be delivered at a given rate, is encrypted in known cryptography systems in blocks of data. The data is broken into blocks of data. The blocks can be formed of a plurality of bytes of data and may be of varying length. Each block is encrypted according to an encryption algorithm on a block by block basis. The decryption of the data is then carried out in a similar block by block manner.

When dealing with streams of data where the data is time dependent as opposed to blocks of text or binary data, block encryption is no longer appropriate or indeed possible. Streams of data include multi-media streams of voice, video, sensor data, and other types of data. This technology is applicable to pervasive computing, media streams, Internet music and video, command and control situations etc.

Streams may have a real time or data rate dependency, or may be sporadic and intermittent. Streams deliver data a byte at a time and may even have bytes skipped. Therefore, the bytes cannot be collected into blocks for encryption before delivery to the intended destination, as this will destroy the delivery rate and flow of the stream of data. For example, a stream of data may be communicated from a control environment in the form of one byte per week, a problem arises if the bytes must be collected into blocks before being communicated.

Current solutions buffer the data and encode the data using block ciphers. This can cause problems with real time or sparse streams.

An encryption system is needed that can operate on a byte per byte basis. This forces a type of encryption that is basically a byte substitution cipher, for example, a Caesar cipher and a Vigenere cipher. A Caesar cipher is a simple substitution cipher which uses an algorithm which shifts each letter in a message a certain number of spaces. An approach to cracking this form of cipher is to use statistical data about language letter frequencies. For example, the English language can be analysed to give a table of the frequency of occurrence of each letter in a text of say 1000 letters. An enciphered text can then be analysed to determine the letter frequencies and the frequencies compared to the known English language letter frequencies.

A more complex form of substitution cipher is the Vigenere cipher which is a polyalphabetic cipher. This form of cipher attempts to suppress the normal frequency data by using more than one alphabet to encrypt the message which results in a one to many relationship between each letter and its substitutes. The Vigenere cipher uses a table with each letter of the alphabet defining a row and each letter of the alphabet defining a column. The cipher table is used together with a keyword to encipher the message. The keyword is repeated as many times as necessary above the plaintext message. For each letter of the plaintext message one finds the intersection of the row given by the corresponding keyword letter and the column given by the plaintext letter. Decryption is carried out by performing the reverse procedure, but the recipient needs to know the keyword.

Although harder to crack than simple Caesar ciphers, the Vigenere cipher can still be cracked by frequency analysis by locating bigrams in the ciphertext to determine the length of the keyword.

Substitution ciphers therefore have the disadvantage that they tend to be possible to crack using some form of frequency analysis.

The present invention uses non-linear dynamics and Chaos Theory to prevent the frequency analysis approach of cracking the encryption. By the very nature of chaotic systems, they do not repeat and hence they are not susceptible to pattern or frequency analysis.

Fractal equations are one form of Chaos Equation and it is known to create encryption methods in visual cryptography using fractal equations. In normal visual cryptography, an image is encrypted by performing an XOR operation on the image with a key. The key can be a small image with randomly selected pixel colours. The key is XORed with the pixels of the actual image until all the image is encrypted. The image can be decrypted by XORing the encrypted image with the same key. Fractal visual encryption uses the same method with fractal geometry in Fractal Iteration of Information (FITIN) (http://www.cs.rit.edu/~nrr8953/fractal.html).

This form of visual encryption using fractals is based on symmetry which leads to reversibility in the encryption procedure. Due to physical limitations which restrict the use of the fractal geometry in visual encryption, the visual encryption achieved through this method is so far linear that it is not a good encryption for serious data.

In the present invention equations from Chaos Theory, including fractals, are used to generate the encoding bytes for encrypting and decrypting data. There is no need for the concept of a block size or that every byte must be processed.

Although the present invention has advantages in encrypting streams of data with a data rate dependency, the encryption method of the present invention can also be used with data blocks with no rate dependency.

The normal meaning of "chaos" is a condition or place of great disorder or confusion, which sounds similar to the meaning of randomness: having no specific pattern. However, chaos as it relates to Chaos mathematics is very different. Most academic institutions will refer to chaos by a different name such as non-linear dynamics.

A chaotic system is not a random system, for example; a roulette wheel is a chaotic system not a random system because;

To find out how high a ball will be after bouncing straight up and down against the ground for a certain amount of time. Find the height that the ball is dropped, the strength of gravity, etc. and use these numbers in the relevant equations to get the answer.

A ball on a roulette wheel is a similar system with the addition that the table spins. The laws of motion state that it has one and only one final destination, it cannot be random. To find where on the roulette table a ball would land; find the height the ball was dropped, the speed and dimensions of the roulette table. Use this data in the appropriate equations to get the answer.

Therefore:

A chaotic system can be used to encrypt data, and the same system used to decrypt the data.

A random system can be used to encrypt data, but cannot decrypt the data since it is not possible to determine the matching random state (if it was possible, then it would not be random).

In this document, the term Chaos Equations is taken to include all forms of non-linear equations that are used to describe chaotic behaviour. There is an infinite set of such equations and only selected examples can be illustrated in this disclosure. Examples of Chaos Equations include, Fractal equations including Julia sets, Strange Attractors such as the Lorenz attractor, the Rossler attractor, the Hénon attractor, the Gumowski/Mira attractor, the Tinkerbell attractor, the Periodic attractor, etc.

SUMMARY OF THE INVENTION

According to a first aspect of the present invention there is provided a method of encryption of data, in which the data is made up of a series of data items, the method including the following steps: selecting a chaotic equation from a set of chaotic equations; defining starting conditions of the variables of the chaotic equation in the form of an input key; and applying the chaotic equation to each data item.

The set of chaotic equations may include a plurality of different types of chaotic equations and the step of selecting a chaotic equation may be carried out more than once during a transmission of a series of data items.

Preferably, the data is a continuous stream of data items. The stream of data items may have a rate dependency.

Optimally, the method includes an iterate step of updating the chaotic equation and the input key for each iteration value. An updated chaotic equation may be applied to each subsequent data item.

The data item may be a byte, a word or a dword.

Preferably, the step of applying the chaotic equation to the data item includes applying a modular arithmetic operation to combine the real and imaginary parts of the result of the chaotic equation and the data item. The encrypted data item may be calculated as $v \equiv (v \: xor \: |z_{n+1}|) \bmod v_{max}$, where $z_{n+1}$ is the value of the chaotic equation and $v_{max}$ is the maximum value of v.

The chaotic equation may be one of a group that can comprise: Fractal equations, Julia sets, Lorenz attractor, Rossler attractor, Hénon attractor, Gumowski/Mira attractor and Tinkerbell attractor.

The defined variables of the equation may be the key to the encryption and are required at the encrypting source and the decrypting receiver.

Preferably, the method includes skipping data items by applying the chaotic equation to the data item and discarding the result.

The data items may be grouped in blocks with each block having an identifier providing information of the position of the block in the data. The identifier may not be encrypted. A mask may be generated for each block by applying the chaotic equation to each data item in the block.

According to a second aspect of the present invention there is provided an apparatus for encryption of data, in which the data is made up of a series of data items, the apparatus including: means for selecting a chaotic equation from a set of chaotic equations; means for defining starting conditions of the variables of the chaotic equation in the form of an input key; and means for applying the chaotic equation to each data item.

Preferably, the data is a continuous stream of data items. The stream of data items may have a rate dependency.

The apparatus may include a plurality of defined chaotic equations.

Optimally, the apparatus includes an iterate means of updating the chaotic equation and the input key for each iteration value. The means for applying the chaotic equation to the data item may apply an updated chaotic equation to each subsequent data item.

The data item may be a byte, a word or a dword.

The means for applying the chaotic equation to the data item may include applying a modular arithmetic operation to combine the real and imaginary parts of the result of the chaotic equation and the data item. The encrypted data item may be defined as $v \equiv (v \: xor \: |z_{n+1}|) \bmod v_{max}$, where $z_{n+1}$ is the value of the chaotic equation and $v_{max}$ is the maximum value of v.

The chaotic equation may be one of a group that can comprise: Fractal equations, Julia sets, Lorenz attractor, Rossler attractor, Hénon attractor, Gumowski/mira attractor and Tinkerbell attractor, The defined variables of the equation may be the key to the encryption and are required at the encrypting source and the decrypting receiver.

Preferably, the apparatus includes means for skipping data items by applying the chaotic equation to the data item and discarding the result.

The data items may be grouped in blocks with each block having an identifier providing information of the position of the block in the data. The identifier may not be encrypted. A mask may be provided for each block by applying the chaotic equation to each data item in the block.

According to a third aspect of the present invention there is provided a computer program product stored on a computer readable storage medium, comprising computer readable program code means for performing encryption of data made up of a series of data items, including for performing the following steps: selecting a chaotic equation from a set of chaotic equations; defining starting conditions of the variables of the chaotic equation as an input key; and applying the chaotic equation to each data item.

According to a fourth aspect of the present invention there is provided a method of detecting unauthorised use of a device comprising: providing an initial input key for a device; the device communicating with a server using encrypted data, wherein the input key for the encryption is updated for every data item encrypted; at the end of a communication, storing the last used input key in a persistent store in the device and the server; at the next communication using an iteration of the stored input key.

The device may be a mobile telephone, a smart card or a magnetic stripe card.

The encryption method may use a chaotic equation and the initial input key may be the starting conditions of the variables of the chaotic equation. The data items may be bytes of data.

According to a fifth aspect of the present invention there is provided an apparatus comprising a device and a server with which the device communicates at each use of the device, the device having an initial input key corresponding to an initial input key in the server; means for communication between the device and the server using encrypted data, wherein the input key for the encryption is updated for every data item encrypted; storage means in the device and the server for storing the last used input key in a communication; the device using an iteration of the stored input key for the next communication.

The device may be a mobile telephone, a smart card or a magnetic stripe card.

The means for communication may use encryption based on a chaotic equation and the initial input key may be the starting conditions of the variables of the chaotic equation. The data items may be bytes of data.

A method for encryption of data items is provided by defining a cipher key based on variables in a chaotic equation. The method includes selecting a chaotic equation, defining starting conditions of the variables of the equation, and applying the equation to each data item. The real and imaginary parts of the result of the iteration of the chaotic equation are combined with the data item by an arithmetic operation, for example and XOR operation. Data items in a continuous stream with a rate dependency can be encrypted and decrypted on an item by item basis.

BRIEF DESCRIPTION OF THE DRAWINGS

Embodiments of the invention will now be described, by means of example only, with reference to the accompanying drawings in which.

DETAILED DESCRIPTION OF THE PREFERRED EMBODIMENT

Figure 1:
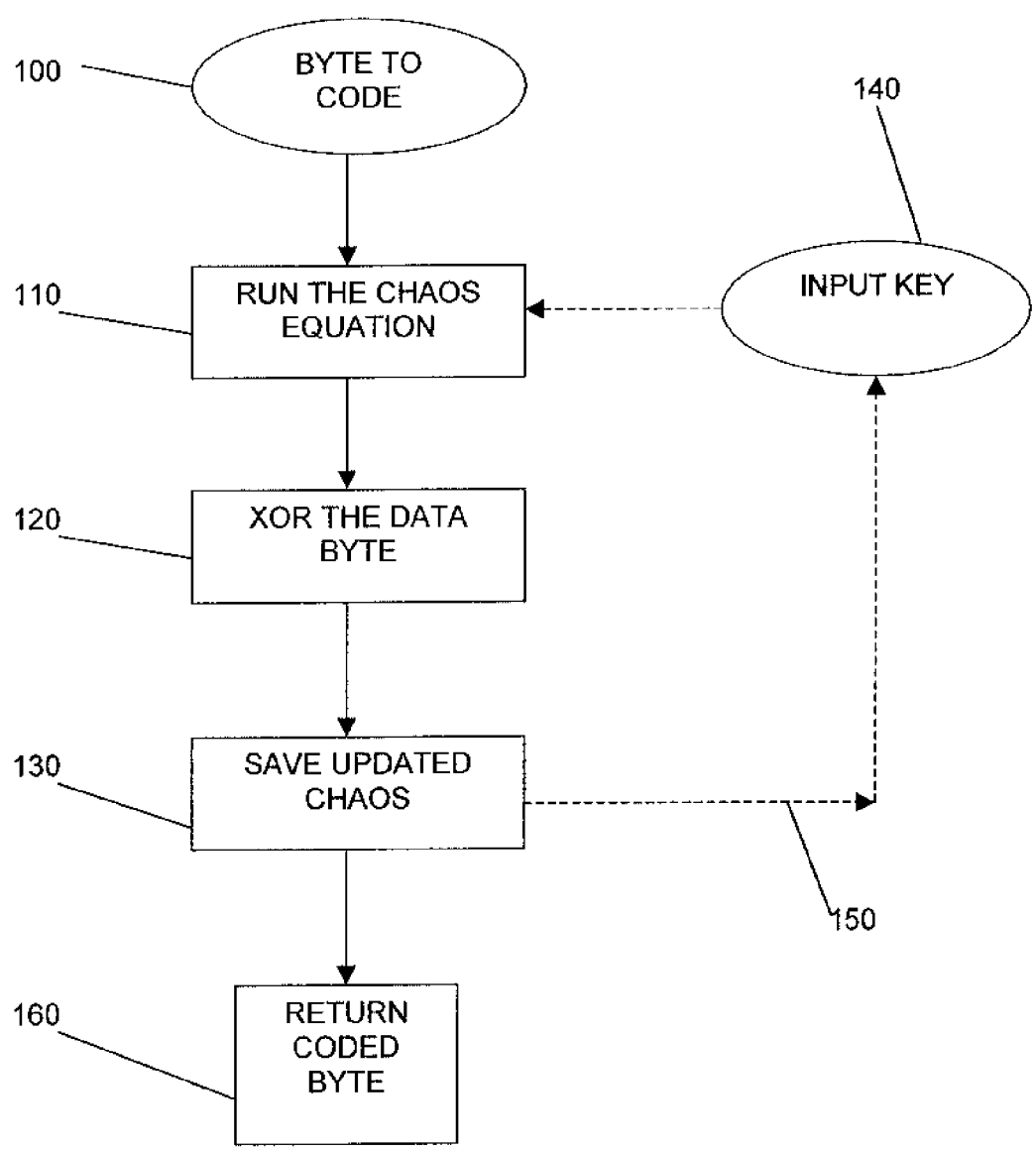
FIG. 1 is a flow diagram representing the encryption method of the present invention.

An encryption method is provided for encrypting and decrypting streams of data on a byte by byte basis using a key which is defined by a Chaos Equation. The key is defined by the equation and the parameters used, for example the starting point. The encrypted data can only be decrypted by a receiver with details of the equation used, the starting variables in the equation and the constants used in the equation.

There is provided a library of algorithms based on Chaos Equations (including Fractals) which may be used. More than one algorithm can be used during a transmission by dynamically changing the algorithm used for encryption and decryption at the sending and receiving ends of the transmission.

Various specific examples are now described using a selection of Chaos Equations.

EXAMPLE 1

Fractal equations are a type of Chaos Equation. Fractal geometry describes objects in non-integer dimensions. Fractal equations describe geometric figures with a property of invariance under a change of scale known as "self-similarity".

Imagine a three dimensional surface derived from a Fractal equation and draw round the edge of the surface for a chosen height (Note: Fractal edges are of infinite length). The line represents the key used to encode the data. In other words the key is defined by the:

Fractal surface chosen
Line start point
Line height chosen
Line direction

An example Fractal equation is the following:

$$z_{n+1} = f(z_n) = z_n^2 + c$$

The value $z_{n+1}$ is used to encode the data; it is not predictable without knowing the complex number c, the iteration number, the starting $z_0$ value and the actual equation used.

Setting the starting values of $z_0$ and c is equivalent to setting the cipher key i.e. setting the real and imaginary parts of $z_0 = (z_{0_x} + iz_{0_y})$ and $c = (c_x + ic_y)$.

When $|z_0| > 1$ and $|c| > 1$ (the desired case), the calculation tends towards $\infty$ (known as the $\infty$ attractor) therefore the values would overflow on a computer, to prevent this from happening modular arithmetic is used. Therefore, the equation becomes:

$$z_{n+1} \equiv (z_n^2 + c) \bmod z_{max}$$

Where the complex number $z_{max}$ is the maximum allowed value of the complex number z.

In order to apply this encrypt or decrypt algorithm to the data item v (Note: v could be a byte, word or dword), we combine the real and imaginary parts of $z_{n+1}$ e.g.

$$v \equiv (v \operatorname{xor} |z_{n+1}|) \bmod v_{max}$$

Where $v_{max}$ is the maximum value of v.

Other Fractal equations could be used, for example:

$$\begin{aligned} z_{n+1} &= f(z_n) \\ &= z_n^2 + (1+\varepsilon)e^{\frac{2\pi i}{20}} z_n \\ &= (z_{n_x} + iz_{n_y})^2 + (1+\varepsilon)\left(\cos\frac{2\pi}{20} + i\sin\frac{2\pi}{20}\right)(z_{n_x} + iz_{n_y}) \\ &= z_{n_x}^2 - z_{n_y}^2 + 2iz_{n_x}z_{n_y} + (1+\varepsilon)\left(\cos\frac{2\pi}{20}(z_{n_x} + iz_{n_y}) + \sin\frac{2\pi}{20}(iz_{n_x} - z_{n_y})\right) \end{aligned}$$

The same process would be applied with the above equations using $v \equiv (v \text{ xor} |z_{n+1}|) \bmod v_{max}$ to provide a variation of the fractal cipher.

EXAMPLE 1

Algorithm

For the purpose of key generation we can assume that c.r and c.i are constant. Modular arithmetic is used to stop the real and imaginary parts of $z_n$ from becoming excessively large since we will be using the ∞attractor rather than the 0 attractor.

Therefore, to encrypt the data the calculated real and imaginary parts are combined with the data byte, the resultant is an encrypted data byte, hence we get the following:

```
{ complex number type definition               }
type
   TComplex = record
        r         : Extended;      { real part        }
        i         : Extended;      { imaginary part   }
   end;
{ arbitrary starting condition values; note: z value will
change  }
const
   c      : TComplex      = (r: 3.2616;      { parsec in light years }
                             i: 9.64846E4 ); { Faraday constant      }
   zmod   : TComplex = (r: 1000000;          { real modulus          }
                        i: 1000000 );        { imaginary modulus     }
{ Absolute value of a complex number                              }
function ComplexAbs ( a : TComplex )     : Extended;
   begin
      result := Sqrt ( a.r * a.r + a.i * a.i ) ;
   end;
{ complex remainder                            }
function Remainder( a : TComplex; b : TComplex) : TComplex;
   begin
      result.r := a.r – ( Trunc( a.r / b.r ) * b.r );
      result.i := a.i – ( Trunc( a.i / b.i ) * b.i );
   end;
{ encode/decode a byte          z(n+1) = z(n)*z(n) + c }
function Cipher( data : byte ) : byte;
   var
      temp        : TComplex;
   begin
      temp.r    := (z.r * z.r) + (z.i * z.i) + c.r;
      temp.i    := 2.0 * z.i * z.r + c.i;
      z         := Remainder ( temp, zmod );
      result    := data xor Floor( ComplexAbs( temp ) );
   end;
```

The values assigned to z.r, z.i, c.r and c.i become the equivalent of the cipher key that is required at the encrypting source and decrypting receiver.

To handle the Julia set or any other Fractal equation the Cipher function is replaced with the appropriate calculation.

FIG. 1 shows a flow diagram of the described encryption method. A byte 100 to be encrypted is selected. The chosen Chaos Equation 100 being used in the algorithm is run using an input key 140 which defines the variables of the Chaos Equation. The calculated real and imaginary parts of the Chaos Equation 110 are combined with the data byte 120 by an arithmetic operation, in this case an XOR operation. The updated Chaos Equation is saved 130 and the input key 140 is modified by communicating the result of the updated Chaos Equation via the iterate loop 150 in FIG. 1. The coded byte 160 is returned.

Other arithmetic operations can be used at step 120 other than the XOR operation. For example, the values can be added or subtracted or modular multiplication or division could be used.

In the decryption process the reverse method is carried out. In some data delivery systems, delivery of all the bytes of data is not guaranteed and the delivery process may loose bytes of data. If a data byte is skipped and not received, the loop of the decryption process must still be carried out in order to correctly update the input key. In other words skipped bytes are handled by calling the iterate method and discarding the result. If a loop is missed due to skipped bytes, the decryption will become out of sync with the Chaos Equation and the decryption will fail.

The synchronisation between the bytes and the updating of the Chaos Equation via the input key also ensures that the data has not been tampered with in transit. Any change to the sequence or the bytes will result in an incorrect decryption.

EXAMPLE 2

Chaotic encryption can be based on the Lorenz attractor. The Lorenz attractor consists of the following equations:

$$x_{n+1} = a(y_n - x_n)$$

$$y_{n+1} = rx_n - y_n x_n z_n$$

$$z_{n+1} = x_n y_n - bz_n$$

Figure 2:
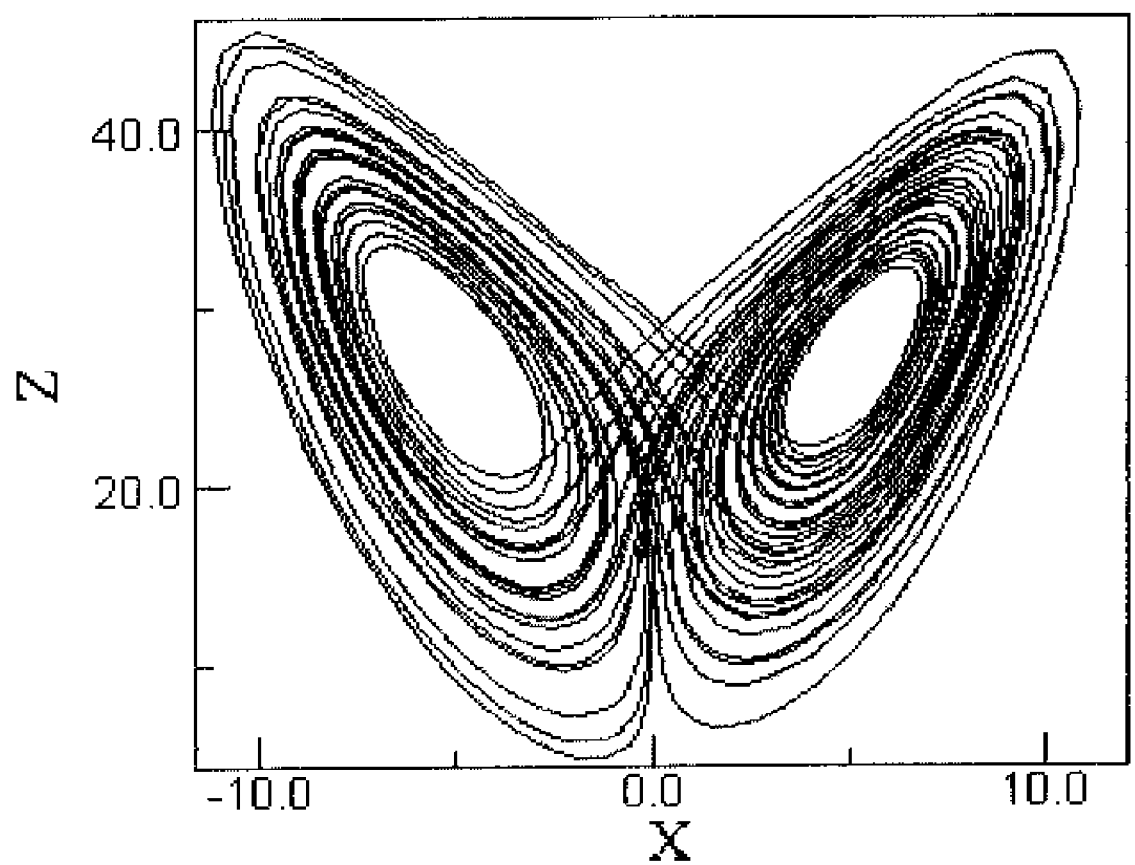
FIG. 2 is a plot of the Lorenz attractor used in the embodiment of Example 2 of the present invention.

A plot of the Lorenz attractor is given in FIG. 2 with a=16, b=4, r=45, x=8 and z=14.

The attractor will continue weaving back and forth between the two wings. Lorenz proved that complex, dynamical systems show order, but they never repeat.

The Lorenz attractor is important because, like all "well behaved" chaotic systems, the accuracy of any predictions about its future behavior decays exponentially as the interval between the present and the time for which predictions are being made increases. Another important quality of chaotic systems that is readily visible in this attractor is the sensitivity to change. If you change a single initial value of x, y, or z by the slightest amount, the difference in the results will grow rapidly as time moves on.

```
const
   a                     : Integer = 16;
   b                     : Integer =  4;
   r                     : Integer = 45;
{ encode/decode a byte                                            }
function Cipher( data : byte ) : byte;
   var
      xp                 : Integer;
      yp                 : Integer;
   begin
      xp       := (y – x) * a;
      yp       := (r * x) – y – (x * z);
      z        := (x * y) – (b * z);
      y        := yp;
      x        := xp;
      Result   := data xor (x + y – z);
   end;
```

EXAMPLE 3

Chaotic encryption can be based on the Rossler attractor. The Rossler attractor is a simple set consisting of the following differential equations:

$$x_{n+1} = -y_n - z_n$$

$$y_{n+1} = x_n + ay_n$$

$$z_{n+1} = b + z_n(x_n - c)$$

Figure 3:
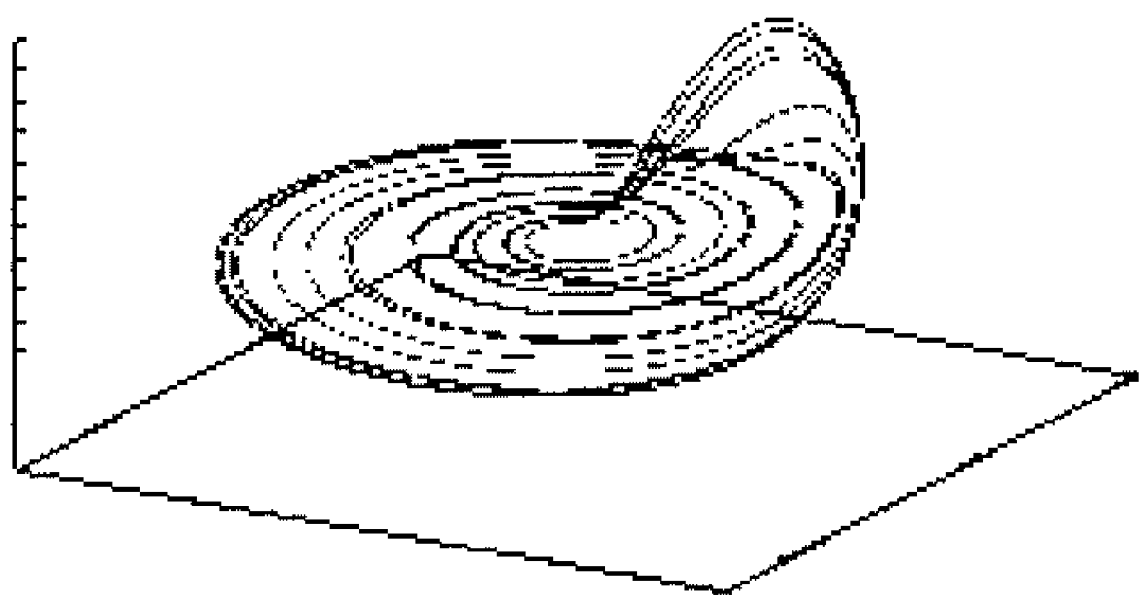
FIG. 3 is a plot of the Rossler attractor used in the embodiment of Example 3 of the present invention.

A plot of the Rossler attractor is given in FIG. 3 with a=0.2, b=0.2, c=2.2

When the differential equations are graphed in 3-D space, they demonstrate what is known as banding. At c=2, there are two bands, the function follows these two bands, alternating between the two of them. This is because the attractor for the system is has a period of two. As c increases, the period continues to double, and so do the bands. As c approaches 6, the number of periods goes to infinity and the attractor becomes chaotic.

```
const
    a                   : Extended = 0.2;
    b                   : Extended = 0.2;
    c                   : Extended = 2.2;
{ encode/decode a byte                                      }
function Cipher( data : byte ) : byte;
    var
        xp              : Extended;
    begin
        xp              := - y - z;
        y               := x + a * y;
        z               := (b + z * (x - c));
        x               := xp;
        Result := data xor Floor( z );
    end;
```

EXAMPLE 4

Chaotic encryption can be based on the Hënon attractor. The Hénon map is a prototypical 2-D invertible iterated map with chaotic solutions proposed by the French astronomer Michel Hénon as a simplified model of the Poincare map for the Lorenz model.

The attractor is a simple set consisting of the following differential equations:

$$x_{n+1} = y_n + 1 - ax_n^2$$

$$y_{n+1} = bx_n$$

Figure 4:
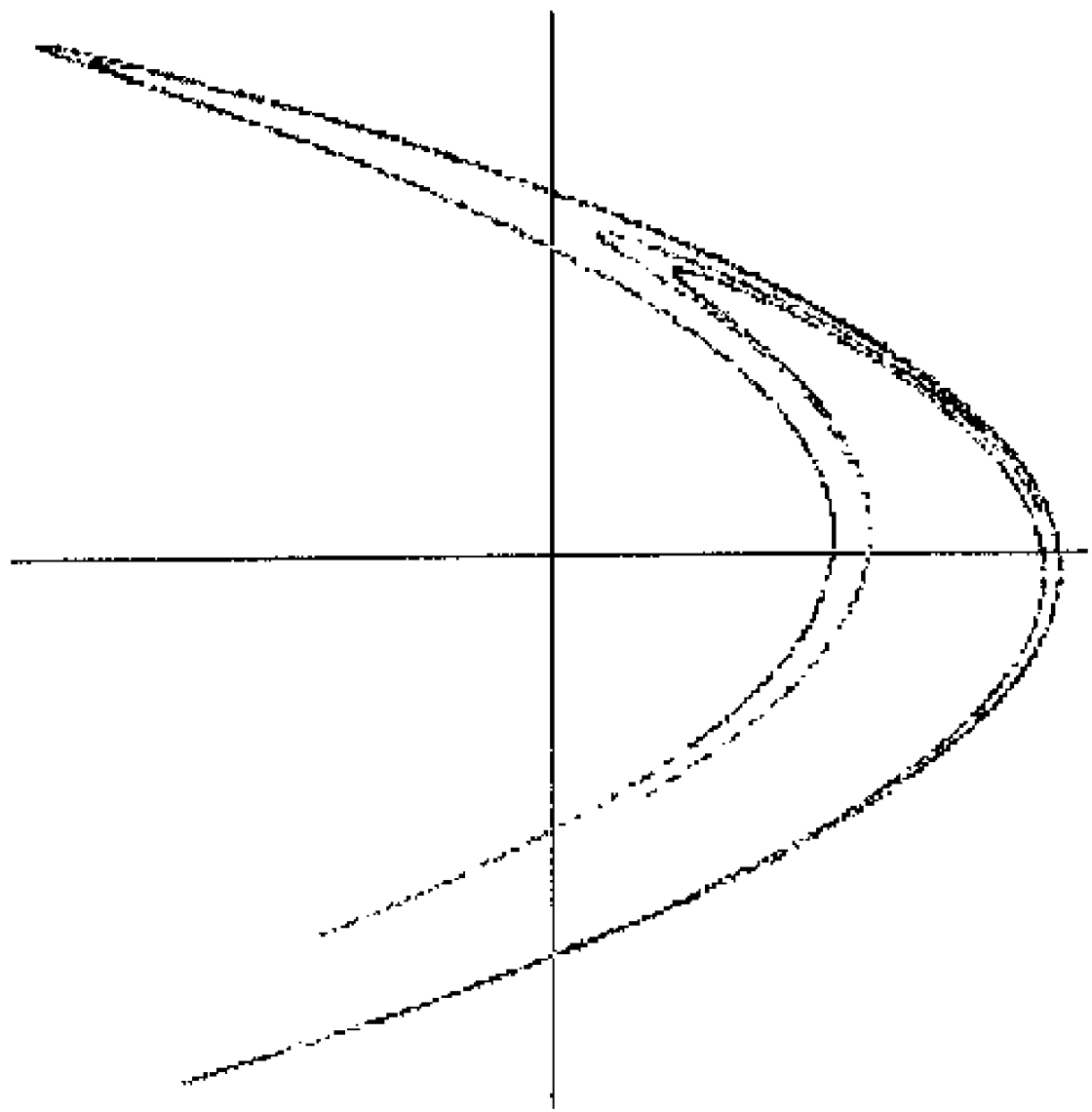
FIG. 4 is a plot of the Hénon attractor used in the embodiment of Example 4 of the present invention.

A plot of the Hénon attractor is given in FIG. 4 with a=1.4, b=0.3. Each point on the display shows where the orbit of the system's 3-Dimensional strange attractor passes through the x-y plane. The plot is thus a slice of the complex orbit at a particular position around it. This was used to illustrate the chaotic aspects of a star's orbit around and through the galaxy or cluster to which it belongs.

However, it is not quite that straightforward. The pattern of a slice through such a complex orbit changes form according to the total energy of the system. The Hénon strange attractor is an attractor to which all these real-world attractors are attracted. It is formed from those other attractors when normal space is bent and folded to form a particular phase space in which this 'attractor of attractors' looks simple.

```
const
    a                   : Extended = 1.4;
    b                   : Extended = 0.3;
{ encode/decode a byte                                      }
function Cipher( data : byte ) : byte;
    var
        xp              : Extended;
    begin
        xp              := (y + 1) - (a * x * x);
        y               := b * x;
        x               := xp;
        Result := data xor Floor( x + y );
    end;
```

EXAMPLE 5

Chaotic encryption can be based on the Gumowski/Mira attractor. A formula is named after the two Physicists (or mathematicians) that discovered it. Their names are Gumowski and Mira. They did experiments at the CERN research facility in Geneva Switzerland. They were trying to calculate (or simulate) the trajectories of elementary particles like protons that move at high speeds in an accelerator, a circular channel with the diameter of a tin can but several meters long. Gumowski and Mira used the formula to simulate the orbits of the particles.

$$f(x) = ax + \frac{(1-a)2x^2}{1+x^2}$$

$$x_{n+1} = by_n + f(x_n)$$

$$y_{n+1} = -x_n + f(x_{n+1})$$

In which a is a parameter to be chosen usually anywhere in the range of −1 to 1. Parameter b is a very sensitive constant and usually stays at a value that is very close to 1.000. If the constant b is slightly increased to a value of 1.001, then the trajectory will usually expand (or spiral outward to infinity). If the constant b is slightly decreased to something like a value of "0.999", then the trajectory will contract (or spiral inward) towards the attractor points.

Figure 5:
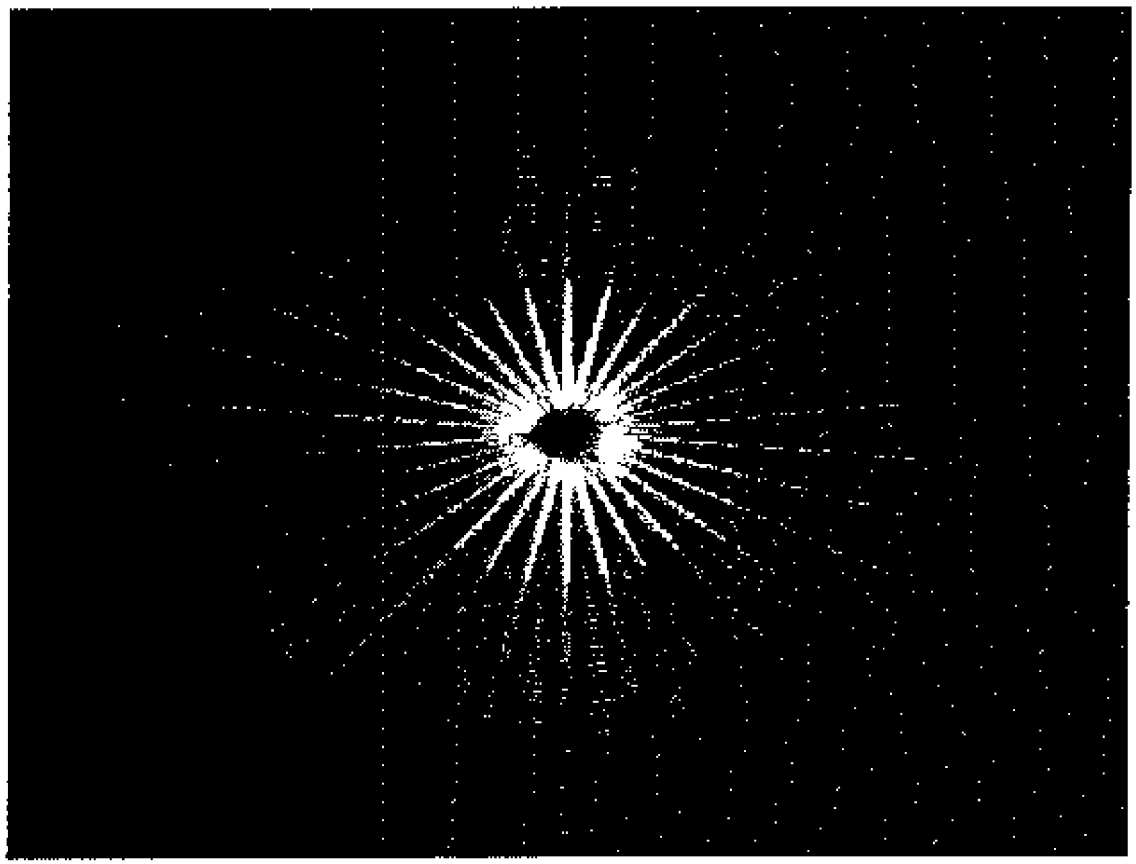
FIG. 5 is a representation of the Gumowski/Mira attractor used in the embodiment of Example 5 of the present invention.

A representation of the Gumowski/Mira attractor is given in FIG. 5 with x=19.945948645, y=4.749808544, a=−0.669105405, b=1.00001.

```
const
    a                   : Extended;
    b                   : Extended;
{ Calculate next x                                          }
function Fx( xn : Extended ) : Extended;
    begin
        Result := a * xn + ((1 - a) * 2 * xn * xn) / ( 1 + xn *xn );
    end;
{ encode/decode a byte                                      }
function Cipher( data : byte ) : byte;
    var
        xp              : Extended;
    begin
        xp              := b * y + fx( x );
        y               :=   - x + fx ( xp );
        x               := xp;
        Result := data xor Floor ( x + y );
    end;
```

EXAMPLE 6

Chaotic encryption can be based on the so-called Tinkerbell attractor. This chaotic attractor is illustrated in FIG. 6 and has a basin of attraction and periodic orbits with period smaller then or equal to 8.

$$\frac{\delta x}{\delta y} = x_{n+1} = x_n^2 - y_n^2 + ax_n + by_n$$

$$\frac{\delta y}{\delta x} = y_{n+1} = 2x_n y_n + cx_n + dy_n$$

Figure 6:
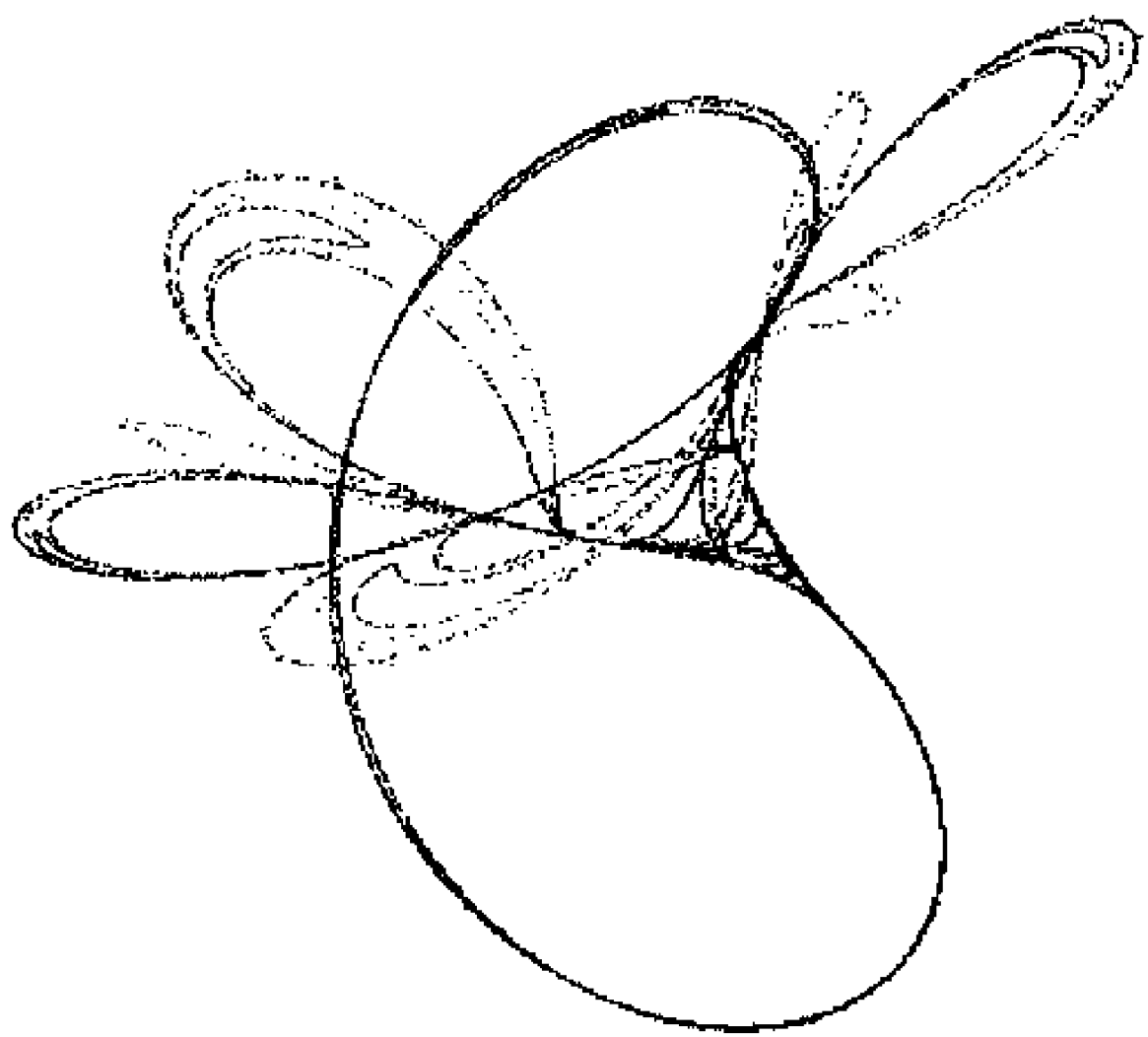
FIG. 6 is a representation of the Tinkerbell attractor used in the embodiment of Example 6 of the present invention.

In FIG. 6, a=−0.7, b=−0.6013, c=2.0, d=0.4 and there is a stable orbit at a=0.485.

```
function Tinker ( data : byte ) : byte;
var
    xp      :   Extended;
begin
    xp      : = x * x - y * y + a * x + b * y;
    y       : = 2 * x * y + c * x + d * y;
    x       : = xp;
    Result  : = data xor Floor ( y - x );
end;
```

It will be appreciated by a person skilled in the art, that any Chaotic Equation could be used to encrypt a stream of data using the method as described herein. A plurality of Chaos Equations can be defined in an encryption system and new equations can be added indefinitely. This particularly suits object-based systems. An encryption can only be decrypted by a person with the same defined Chaos Equation and the details of the starting variables and constants used in the equation.

Real time situations in which the described encryption method is highly useful include the following. Command and control security situations, for example, communication with a remote aircraft. Media stream such as those recorded on DVDs which include split streams which can be encrypted separately.

Although the present invention has advantages in encrypting streams of data with a data rate dependency, the encryption method of the present invention can also be used with data blocks with no rate dependency. The data blocks can be as small as one byte of data.

The nature of encryption using Chaotic Equations as described herein is that the equivalent of the cipher key changes for every byte of data and this is not affected by the actual data being encrypted or decrypted. This feature of the encryption method can be exploited to handle data blocks which are received out of sequence.

Figure 7B:
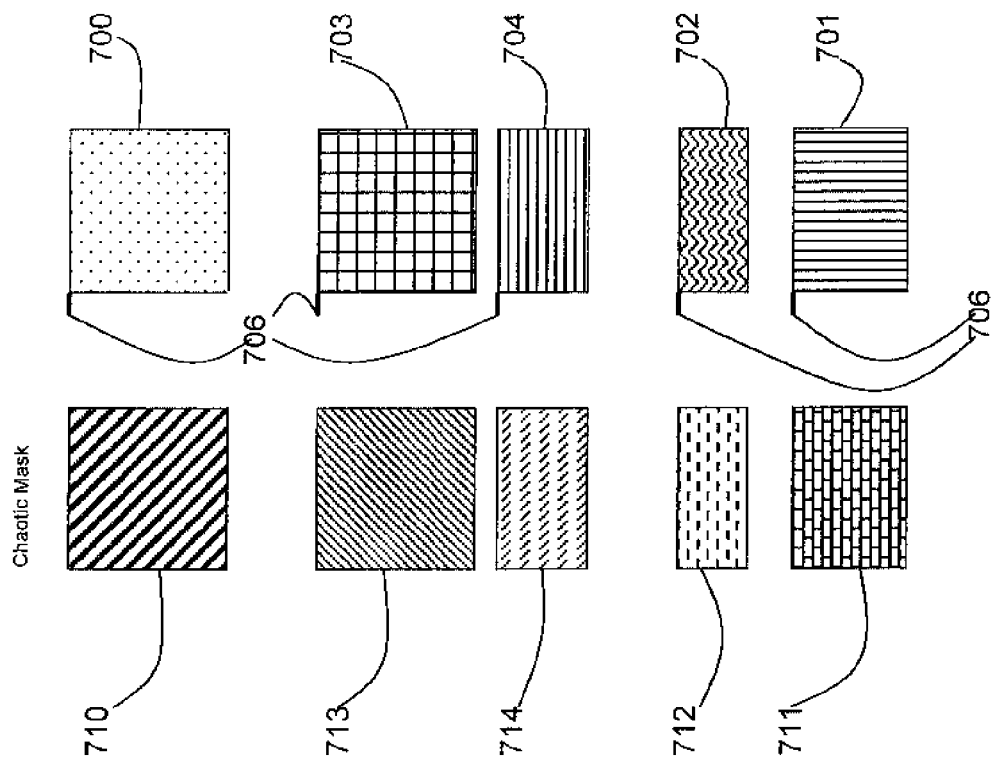
FIGS. 7a and 7b are diagrams of block encryption in accordance with the present invention.
Figure 7A:
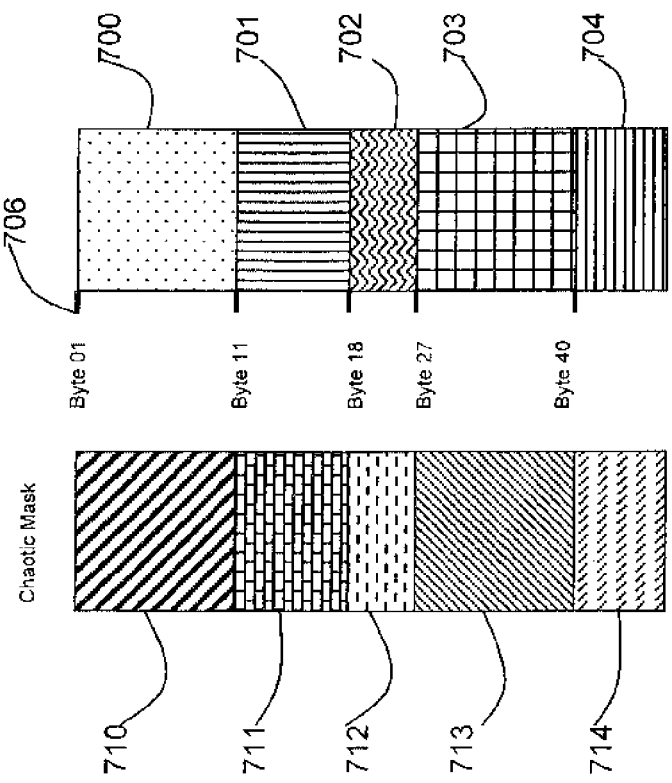

Referring to FIG. 7a, data to be transmitted is shown in the form of a series of blocks of data 700, 701, 702, 703, 704. The blocks of data 700, 701, 702, 703, 704 are of non-uniform length and each block has an identifier 706 stating its byte position within the whole stream of data.

The data is encrypted by using the previously described methods of encryption using a Chaotic Equation and creating encryption data a byte at a time. Starting conditions of the variables for the Chaotic Equation are determined as the input key. In a stream of data, each byte of data to be encrypted is combined by an arithmetic operation with a value generated by the Chaotic Equation at each byte iteration. In block encryption, values are generated by the Chaotic Equation for each byte of the block to create a chaotic mask 710, 711, 712, 713, 714. Each chaotic mask 710, 711, 712, 713, 714 is combined with the block of data 700, 701, 702, 703, 704 by an arithmetic operation.

As described in relation to Example 1 above, in some data delivery systems, delivery of all the bytes of data is not guaranteed and the delivery process may loose bytes of data. In a stream of data, if a data byte is skipped and not received, the loop of the decryption process must still be carried out in order to correctly update the input key. In other words skipped bytes are handled by calling the iterate method and discarding the result. If a loop is missed due to skipped bytes, the decryption will become out of synchronisation with the Chaos Equation and the decryption will fail.

This feature of the decryption can be used to handle blocks of data. The blocks of data 700, 701, 702, 703, 704 may be received in a different order to the order in which they were transmitted. This is shown in FIG. 7b. Blocks 701 and 702 have been received out of order after blocks 703 and 704.

When the encrypted data is received, block 700 is received and its identifier 706 indicates that the byte position of the block in the whole stream of data is at byte 1 as it is the first block of data. Block 700 can be decrypted, generating the chaotic mask 710 for the block 700 a byte at a time then carrying out the reverse of the arithmetic operation to obtain the original block of data 700.

The next block of data 703 is received and the identifier 706 indicates that the block 703 has a byte position in the whole data stream of byte 27. This indicates that there is at least one block of data missing from the transmitted data, as block 700 was only 10 bytes in length. This leaves 16 bytes of data missing from the stream of data.

There are two possible methods of handling this situation.

In the first method, the input key of the Chaotic Equation decryption at the byte at which the missing block of data would have started is preserved (in the example of FIGS. 7a and 7b, this is at byte 11). The number of bytes of the missing block of data (or blocks of data) is skipped. In the above case this would be 16 bytes of data. This can be done by using the above described method of calling the iterate method and discarding the result. The block 703 is then decrypted in its correct position starting at byte 27.

When an out of sequence block of data arrives, the input key is reset in the decryptor to the preserved value or a new instance of the cryptor is created and the preserved key is set into it. Decryption can then proceed as normal.

If there is more than one block of data missing as shown in FIG. 7b and a later missing block, block 702 is received before an earlier block, block 701, the method can cope with this due to the identifiers 706. Block 702 has an identifier 706 that indicates that it starts at byte 18 in the stream of data. Therefore, the preserved input key for byte 11 must be iterated to the correct input key for byte 18 and then block 702 can be decrypted. When block 701 finally arrives, the identifier 706 in block 701 will indicate that it belongs at the position of byte 11 and the preserved input key for byte 11 can be used to decrypt block 701.

In the second method, the decryption is run with a data array of the size of the missing block and with the elements of the data array set to zero. This causes the data array to be set with the decryption chaotic mask for the missing block. This data array is preserved and later used to decrypt the out of sequence block when it arrives.

In both methods, the use of the identifier 706 determines the iteration through the chaotic sequence the correct number of times. The identifier 706 must be sent in clear form.

This method of encryption of blocks of data has advantages over known systems of encryption such as DES, Mars, RC6 in that it will allow decryption of variable size blocks of data that may be received in a random order. The known systems cannot be used in this way.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

The method of encryption and decryption using Chaotic Equations in accordance with the present invention in which the key for the encryption/decryption changes with each byte of data has advantages which can be implemented in various devices.

One such implementation is now described. It is a problem with the use of devices such as smart cards, magnetic-stripe cards and mobile telephones that identities of the user and details of the device can be stolen or cloned and the illegal copy of the device used to perform a fraudulent transaction. In the case of smart cards or magnetic-stripe cards a fraudulent sale or cash withdrawal transaction can be made. In the case of a mobile phone, the phone details can be intercepted and re-used by an illegal telephone. Such transactions would not normally be detected until the bill for payment was received by the valid user.

Figure 8:
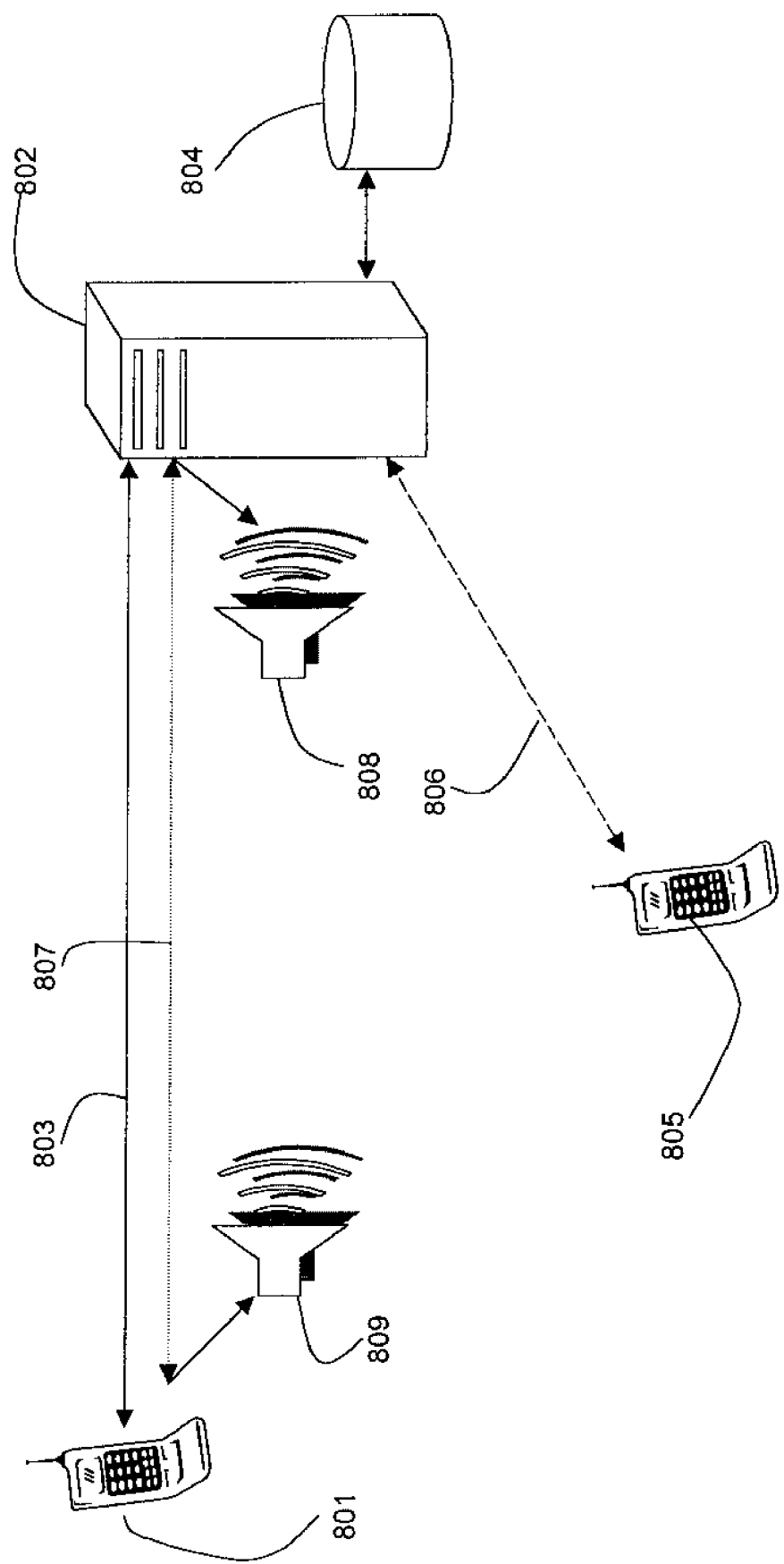
FIG. 8 is a diagram of an implementation of the present invention in the context of mobile telephone use.

Referring to FIG. 8, there is a valid user A of a mobile telephone 801. At the first use of the mobile telephone 801 a key is provided and the mobile telephone 801 is initialised. The key is the starting variables and constants of a Chaotic Equation to be used in the encryption/decryption method. Use of the mobile phone 801 by user A involves communication of messages 803 to a server 802. The messages 803 are encrypted using the above described encryption using a Chaotic Equation in which the input key is updated for each byte of data encrypted in the messages 803.

Due to the change of the input key for each byte of data communicated between the mobile telephone 801 and the server 802, there is no requirement for a session key to be updated and exchanged at the start of each session of communication between the mobile telephone 801 and the server 802.

The server 802 has a key database 804 in which it stores the current key for each mobile telephone associated with the server 802.

In the event that the details of the mobile telephone 801 are intercepted and re-used by a false mobile telephone 805, messages 806 will be communicated between the false mobile telephone 805 and the server 802. As the messages 806 are encrypted and decrypted the input key will be updated at each byte. The input key at the false mobile telephone 805 will change and at the end of the communication it will be saved by the false mobile telephone 805. Similarly, the server 802 will change the input key during each byte of the communication with the false mobile telephone 805 and the server 802 will save the input key at the end of the session in the key database 804.

When user A again uses the mobile telephone 801, the last saved input key in the mobile telephone 801 will be iterated and used to send a message 807 to the server 802. The input key that the server 802 has saved in the key database 804 for the mobile telephone 801 will be out of sequence with the saved input key in the mobile telephone 801. The communication of the message 807 will fail and alarms 808, 809 will be raised at one or both of the server 802 and the mobile telephone 801.

The alarms 808, 809 are raised at the first use of the mobile telephone 801 by the valid user A after the breach has occurred and the next valid use is blocked.

To get both the server 802 and the mobile telephone 801 back into synchronisation, a new chaotic input key or keys must be generated and given to both the server 802 and the mobile telephone 802 and saved in the appropriate persistent stores.

The above implementation has been described in terms of the user of a mobile telephone. The method of encryption/decryption using Chaotic Equations can be applied in the same manner to other devices such as smart cards and magnetic stripe cards in which an input key is updated at each byte of a transaction of the device. In the case of smart cards or magnetic stripe cards a fraudulent sale or cash withdrawal transaction can be carried out with an illegal copy or cloned card.

Figure 9:
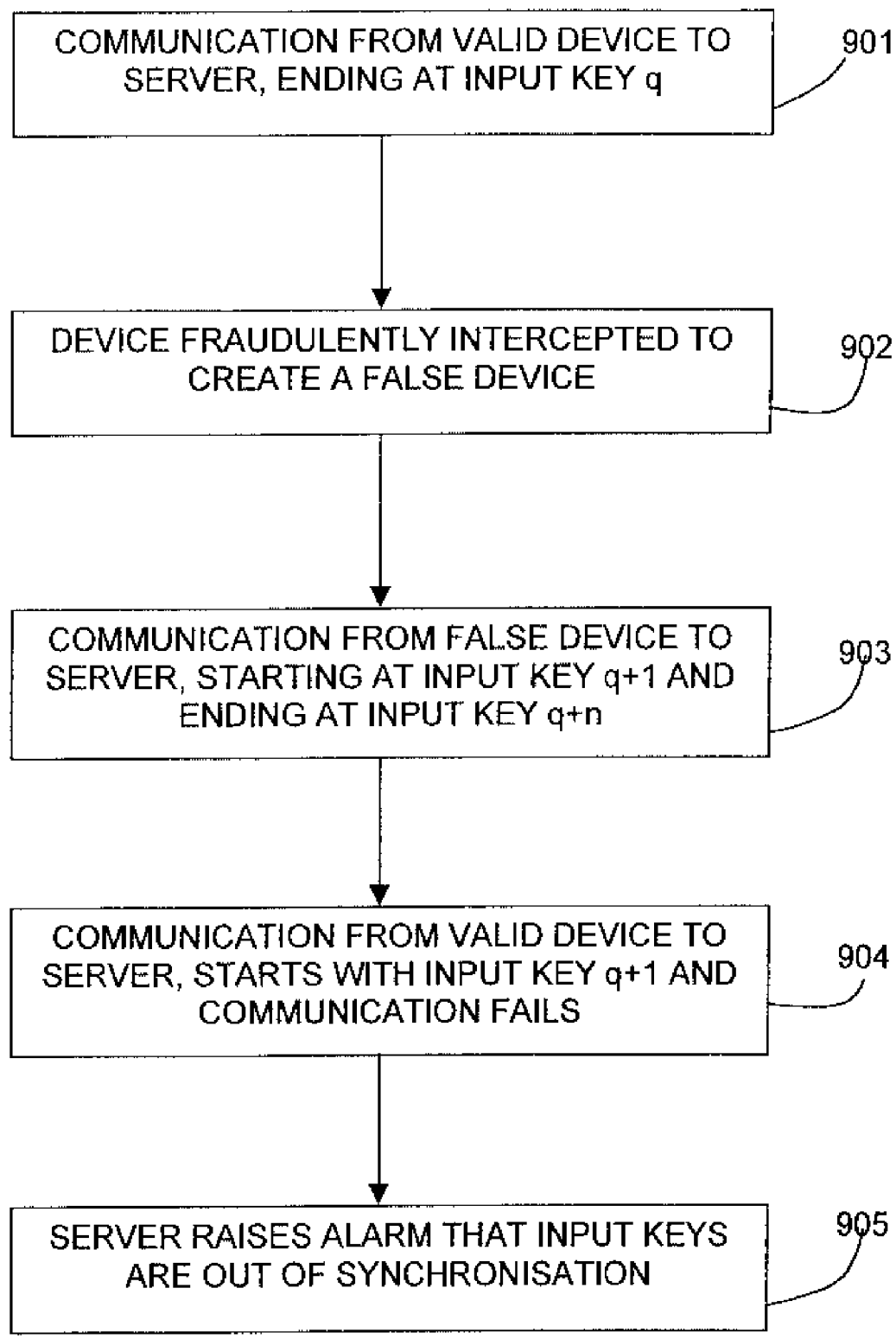
FIG. 9 is a flow diagram of the implementation of FIG. 8.

The update of the input key in a device is described further with reference to the flow diagram of FIG. 9. At the first step 901 of the flow diagram, a valid user A uses a valid device and the valid device communicates with a server. The input key is at value q at the end of the session at both the valid device and the server.

At step 902, the device is fraudulently intercepted and the details are used by an invalid user B. User B uses the false device and, at step 903, the false device communicates with the server. The communication starts at input key q+1 and ends at input key q+n. The server saves the input key at the end of the session as q+n.

At step 904, the valid user A tries to use the valid device and the valid device sends a communication to the server. The valid device uses the input key of q+1 which it believes to be the next correct input key following on from the last communication that the valid device had with the server. The server has saved the input key as q+n following the communication from the false device. Therefore, when the server receives a communication from the valid device using input key q+1 which is out of sequence with its saved input key, the server raises an alarm at step 905 and the communication with the valid device fails.

In an implementation in which the communication stream has the potential to carry out many transactions in a short time, this implementation has strong advantages because detection of fraudulent user would occur very quickly.

The described implementation of encryption/decryption using Chaotic Equations speeds up the detection of an illegal transaction by exploiting the features of chaotic encryption. In the described method of encryption/decryption using Chaotic Equations, the key changes for every byte that is encoded or decoded. If the updated key is preserved in a device such as a smart card, magnetic-stripe card or mobile telephone and at a server end of the communication, any unauthorised use will cause the keys to become out of synchronisation for the valid user. Hence, the very next valid use would be blocked due to the failure of the decryption process and thus the fraudulent use would be detected by both ends of the communication.

Improvements and modifications can be made to the foregoing without departing from the scope of the present invention.

I claim

1. A method of detecting unauthorized use of a device comprising:
    providing an initial input key for a device, the input key being a key for an encryption algorithm;
    encrypting data items to be communicated between the device and the server using the encryption algorithm and the input key, wherein the input key for the encryption algorithm is updated for every data item encrypted;
    communicating the encrypted data items from the device to the server;
    at the end of the communication, storing the last used input key in a persistent store in the device and the server;
    at a next communication using an iteration of the stored input key;
    comparing the iteration of the stored input key in the persistent store of the device to an expected input key determined based on a stored input key in the persistent store of the server; and
    blocking a communication between the device and the server if the iteration of the stored input key does not match the expected input key.

2. The method as claimed in claim 1, wherein the device is a mobile telephone, a smart card or a magnetic stripe card.

3. The method as claimed in claim 1, wherein the encryption method uses a chaotic equation and the initial input key is the starting conditions of the variables of the chaotic equation.

4. The method as claimed in claim 1, wherein the data items are bytes of data.

5. The method as claimed in claim 1, further comprising:
raising an alarm at one or more of the device or the server in response to results of the comparing indicating a mismatch between the iteration of the stored input key in the persistent store of the device and the expected input key.

6. The method as claimed in claim 1, wherein the chaotic equation is one of a group that comprises: Fractal equations, Julia sets, Lorenz attractor, Rossler attractor, Hnon attractor, Gumowski/Mira attractor and Tinkerbell attractor.

7. The method as claimed in claim 1, wherein the data items are grouped in blocks with each block having an identifier providing information of the position of the block in the data items to be communicated, and wherein the identifier is not encrypted using the encryption algorithm.

8. A method of detecting unauthorized use of a device comprising:
providing an initial input key for a device, the input key being a key for an encryption algorithm;
encrypting data items to be communicated between the device and the server using the encryption algorithm and the input key, wherein the input key for the encryption algorithm is updated for every data item encrypted;
communicating the encrypted data items from the device to the server;
at the end of the communication, storing the last used input key in a persistent store in the device and the server; and
at a next communication using an iteration of the stored input key, wherein encrypting data items to be communicated between the device and the server comprises:
applying a chaotic encryption algorithm to each data item, wherein the chaotic equation and the input key are iteratively updated for each data item, and wherein during decryption of the data items at the server, if a data item is skipped and not received by the server, the chaotic equation and input key are iterated for the skipped data item and the result is discarded.

9. The method as claimed in claim 8, wherein applying the chaotic equation to each data item includes applying a modular arithmetic operation to combine real and imaginary parts of a result of the chaotic equation and the data item.

10. The method as claimed in claim 8, wherein the device is a mobile telephone, a smart card or a magnetic stripe card.

11. The method as claimed in claim 8, wherein the encryption method uses a chaotic equation and the initial input key is the starting conditions of the variables of the chaotic equation.

12. The method as claimed in claim 8, wherein the data items are bytes of data.

13. The method as claimed in claim 8, wherein the chaotic equation is one of a group that comprises: Fractal equations, Julia sets, Lorenz attractor, Rossler attractor, Hnon attractor, Gumowski/Mira attractor and Tinkerbell attractor.

14. The method as claimed in claim 8, wherein the data items are grouped in blocks with each block having an identifier providing information of the position of the block in the data items to be communicated, and wherein the identifier is not encrypted using the encryption algorithm.

* * * * *